United States Patent [19]
Tanaka

[11] Patent Number: 5,897,234
[45] Date of Patent: Apr. 27, 1999

[54] CAMERA HAVING FILM SUPPORT PLATE AND CARTRIDGE CHAMBER COVER FOR PROVIDING A FILM PASSAGEWAY

[75] Inventor: Yasuhiko Tanaka, Saitama, Japan

[73] Assignee: Fuji Photo Optical Co., Ltd., Saitama, Japan

[21] Appl. No.: 08/825,699

[22] Filed: Mar. 19, 1997

[30] Foreign Application Priority Data

Apr. 5, 1996 [JP] Japan .................................. 8-084183

[51] Int. Cl.$^6$ ............................ G03B 17/00; G03B 17/02
[52] U.S. Cl. ........................ 396/440; 396/535; 396/536; 396/538
[58] Field of Search .................... 396/440, 442, 396/535, 536, 538

[56] References Cited

U.S. PATENT DOCUMENTS

| | | | |
|---|---|---|---|
| 4,440,483 | 4/1984 | Linke et al. ............................ | 396/535 |
| 4,477,162 | 10/1984 | Matsumoto ............................ | 396/535 |
| 4,482,229 | 11/1984 | Sugiura ................................... | 396/535 |
| 4,751,538 | 6/1988 | Konno .................................... | 396/543 |
| 4,771,303 | 9/1988 | Matsumoto et al. .................... | 396/535 |
| 5,142,316 | 8/1992 | Tanii et al. ............................. | 396/535 |
| 5,150,140 | 9/1992 | Kitazawa ................................ | 396/535 |
| 5,305,039 | 4/1994 | Dassero .................................. | 396/536 |
| 5,473,401 | 12/1995 | Tsunefuji ............................... | 396/536 |
| 5,555,045 | 9/1996 | Tsujimoto et al. ...................... | 396/440 |
| 5,604,555 | 2/1997 | Soshi et al. ............................ | 396/400 |
| 5,678,110 | 10/1997 | Koiwai ................................... | 396/536 |

FOREIGN PATENT DOCUMENTS 62-242923  10/1987  Japan .
8-271962  10/1996  Japan .

Primary Examiner—Eddie C. Lee
Attorney, Agent, or Firm—Sughrue, Mion, Zinn, Macpeak & Seas, PLLC

[57] ABSTRACT

A film passage is formed at a rear side of an exposure aperture which is disposed between a cartridge chamber 11 and a film take-up chamber 12. The film passage comprises a passage channel 15 integrally formed with a camera main body and a film support plate covering a rear side of the passage channel. By covering the passage channel with the film support plate, an inside of the slit-like film passage is maintained in light-tight state before attaching the rear cover to the main body. A film take-up chamber cover is attached to the film take-up chamber to constitute a part of a wall thereof. By covering a rear side of the film take-up chamber with the film take-up chamber cover, the inside of the film take-up chamber is maintained in light-tight state before attaching the rear cover to the main body.

7 Claims, 5 Drawing Sheets

CAMERA HAVING FILM SUPPORT PLATE AND CARTRIDGE CHAMBER COVER FOR PROVIDING A FILM PASSAGEWAY

BACKGROUND OF THE INVENTION

1. Field of the Invention

The present invention relates to a camera and more particularly to a camera used for a photo film cartridge in which a photo film is advanced outside of the cartridge by rotating a spool thereof.

2. Description of the Related Art

So-called Advanced Photo System (hereinafter APS) is recently proposed. A photo film cartridge used in the APS is disclosed in Japanese Patent Laid-open Publication No. 6-301157. The photo film cartridge has a function that a photo film contained within the cartridge is advanced outside of a cartridge main body by rotating a spool incorporated in the cartridge main body. Accordingly, when the photo film cartridge is loaded into or took out from a camera, it is possible to treat the photo film cartridge in a state that the photo film does not come out from the cartridge main body.

By the way, when conventional 135-type photo film cartridge is loaded into a camera, a back lid is opened to expose all of a cartridge chamber, film chamber and a film passage therebetween. And a photo film is drawn out from the photo film cartridge loaded into the cartridge chamber by certain amount to introduce the photo film from the film passage to the film chamber. After that, the back lid is closed to complete the loading of the photo film cartridge.

However, in a camera into which a new type photo film cartridge as described above is loaded, a photo film is advanced outside of a cartridge main body by rotating a spool. Therefore, upon providing an inserted portion through which the photo film cartridge is inserted into a cartridge chamber, the photo film is advanced to a film chamber via a film passage only by rotating the spool without opening the film passage and the film chamber to introduce the photo film.

Thus, a camera into which the new type photo film cartridge is loaded is provided with an opening instead of a back lid for opening the whole of rear face of the camera. The photo film cartridge may be inserted into the cartridge chamber through the opening in an axial direction thereof and the opening is openable with a lid member. Conventional back lid having openable structure is fixed on the rear face of the camera as a part of a wall constituting the film passage and the film chamber. Accordingly, the conventional back lid does not have openable structure so that it becomes a rear cover merely covering the rear face of the camera.

However, as described above, when the rear cover covering the rear side of the camera corresponding to the new type photo film cartridge is fixed on the rear side of the camera as a part of the wall constituting the film passage and the film chamber, the film passage and the film chamber are not completely formed if the rear cover is not completely attached to the rear side of the camera.

Thus, when an advancing test of the photo film is carried out in the process of assembling the camera, it must be carried out after the rear cover is completely attached. When defective advancement of the photo film is detected, it is impossible to repair the defective advancement until taking the camera which is completely assembled apart to pieces so that it requires a lot of time and labor to repair it. If a lot of time and labor are taken when the camera is manufactured as described above, there arise problems in that it cause the efficiency of manufacturing to make worse and in that it cause the manufacturing cost to increase.

SUMMARY OF THE INVENTION

In view of the foregoing problems, it is a primary object of the present invention to provide a camera in which film advancement may be carried out without attaching a rear cover. The camera is used for a photo film cartridge in which a photo film is advanced outside of a cartridge main body by rotating a spool thereof.

It is an another object of the present invention to provide a camera in which tests are easily carried out during assembling the camera.

It is a further object of the present invention to provide a camera in which defective advancement of the photo film may be easily repaired.

In order to active the above and other objects, the camera according to the present invention comprises a film take-up chamber cover and a film support plate. The film take-up chamber cover is attached to a rear of a film take-up chamber of a main body to constitute a part of wall of the film take-up chamber. The film support plate is attached to a rear of a film passage so as to cover an exposure aperture. The film passage is disposed between a cartridge chamber and the film take-up chamber of the main body and at a rear side of the exposure aperture.

In a preferred embodiment, the film take-up chamber cover is provided with a roller which presses a photo film toward a camera spool disposed in the film take-up chamber. The advanced photo film is pressed by the roller and wound around the camera spool.

By fixing the film take-up chamber cover to the main body, the film take-up chamber is maintained in light-tight state. Further, by fixing the film support plate to the main body, the film passage is maintained in light-tight state. After fixing the film take-up chamber cover and the film support plate, a rear cover is attached to the main body from the rear side thereof.

Accordingly, before attaching the rear cover to the main body, there is completed an independent light-tight space in which the photo film is moved from the cartridge chamber to the film take-up chamber via the film passage. Thus, film advancement may be carried out without attaching the rear cover to the main body. Moreover, advancement test of the photo film may be carried out easily.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENT (S)

Figure 1:
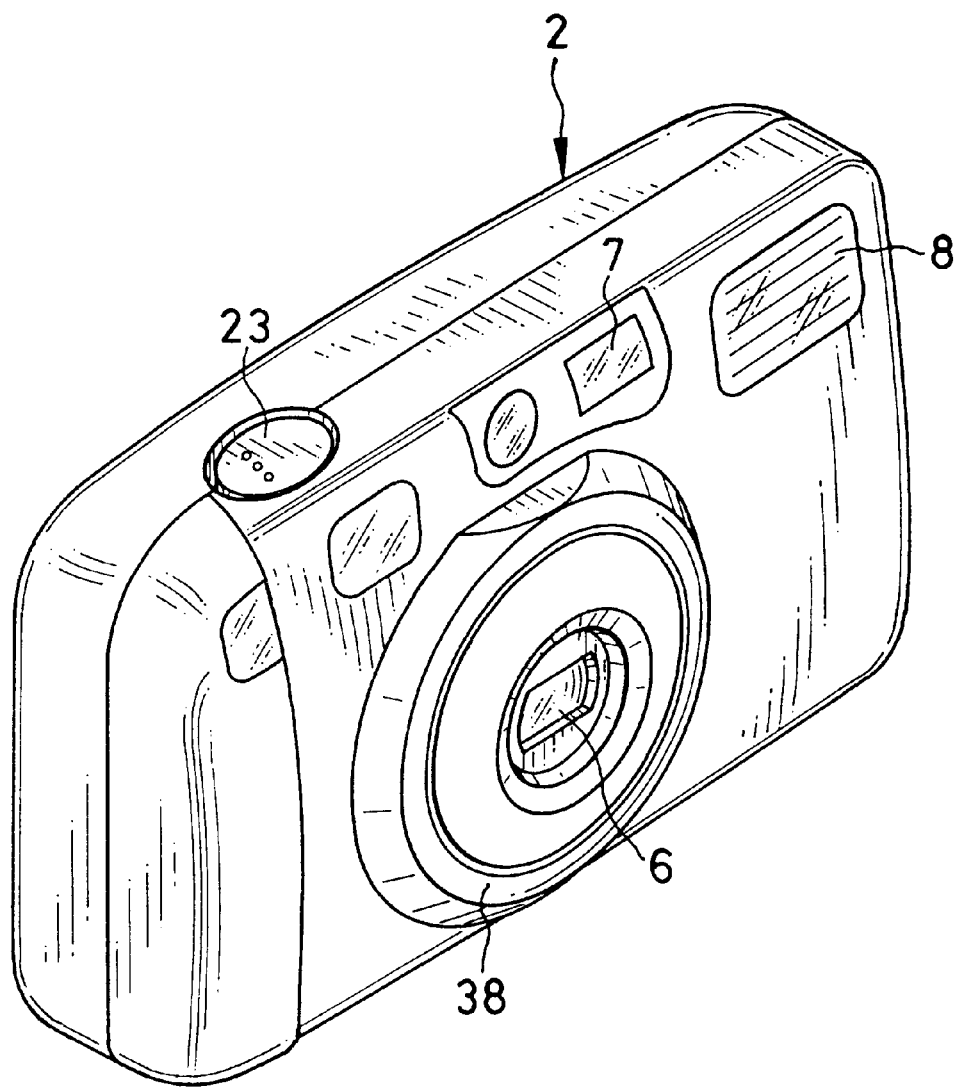
FIG. 1 is a perspective view illustrating an external appearance of a camera according to the present invention.
Figure 2:
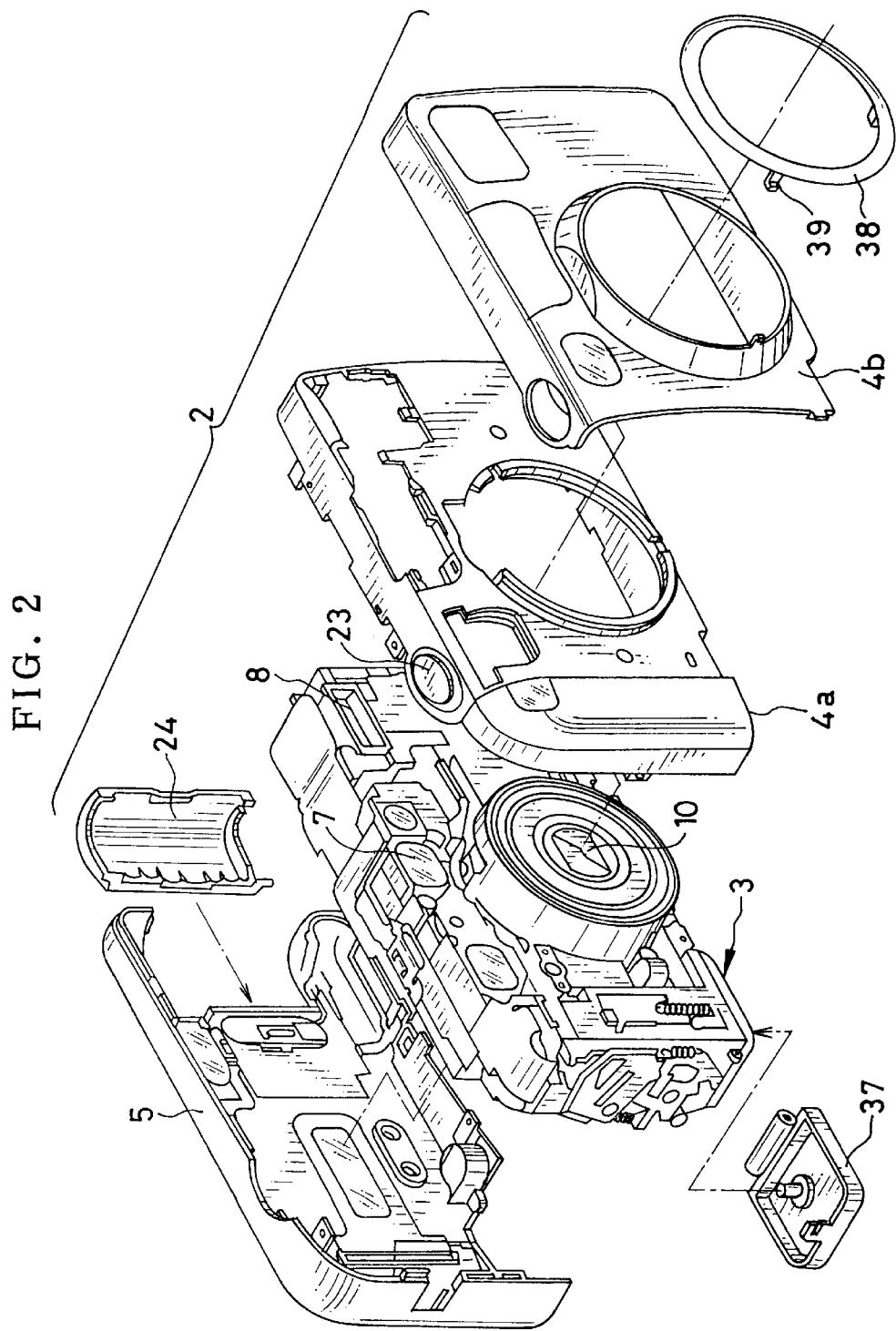
FIG. 2 is an exploded perspective view of the camera.

FIG. 1 shows an external appearance of a camera according to the present invention. FIG. 2 shows the camera in an exploded state. The camera 2 according to the present invention is constituted of a main body 3, a first front cover 4a and a second front cover 4b which are attached to the front face of the main body 3, and a rear cover 5 covering the rear face of the main body 3.

Figure 3:
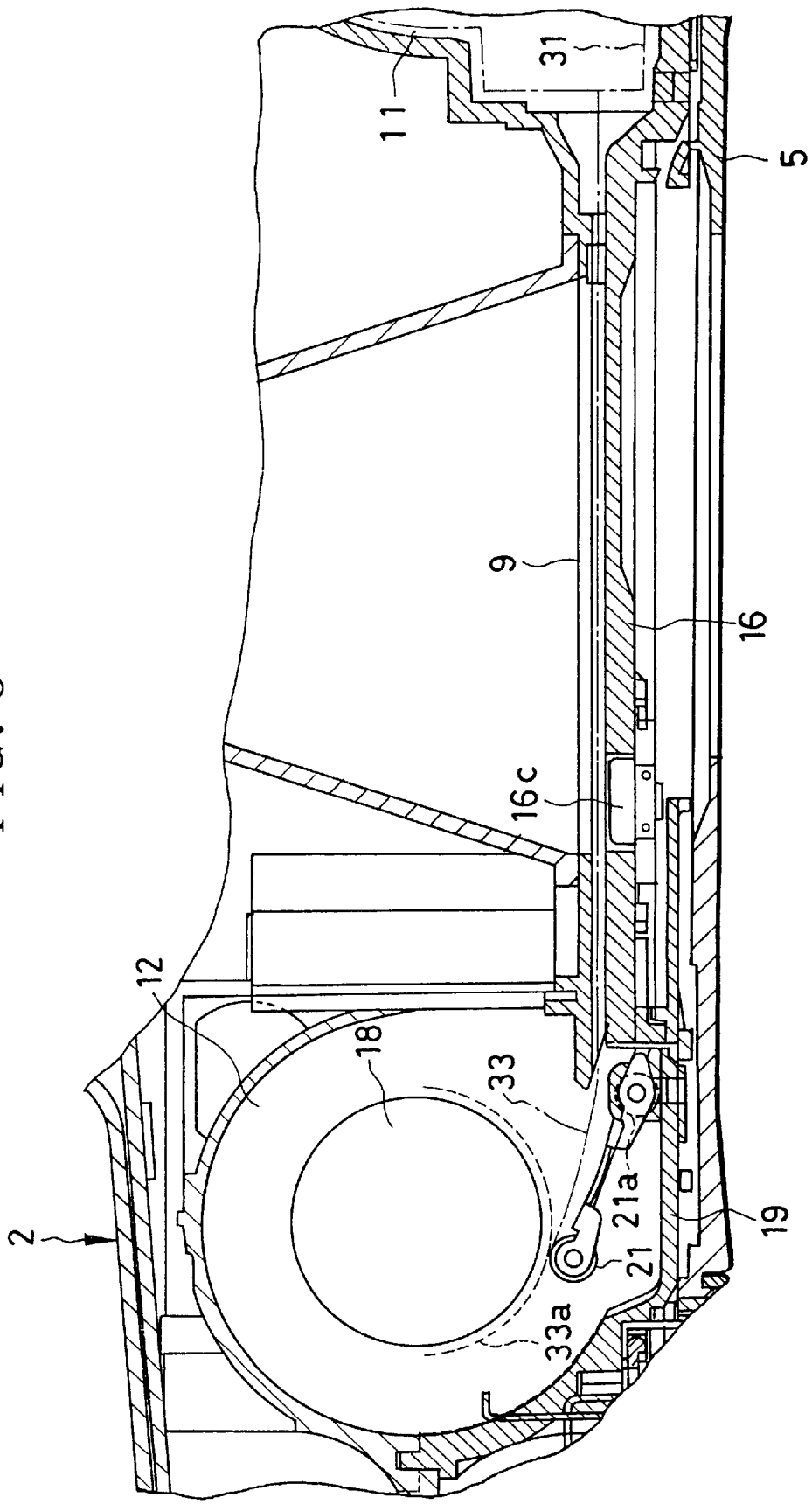
FIG. 3 is a sectional view of the camera.

The main body 3 is provided with a well-known shutter device (not shown), a lens barrel 10 having a taking lens 6, a finder 7, a flash device 8 and so force. As shown in FIG. 3, an exposure aperture 9 defining an exposure frame is formed at a rear side of the taking lens 6 disposed on the central portion of the main body 3. The exposure aperture 9 forms a picture frame on a photo film. At both side of the exposure aperture 9, there are formed a cartridge chamber 11 and a film take-up chamber 12 respectively.

Figure 4:
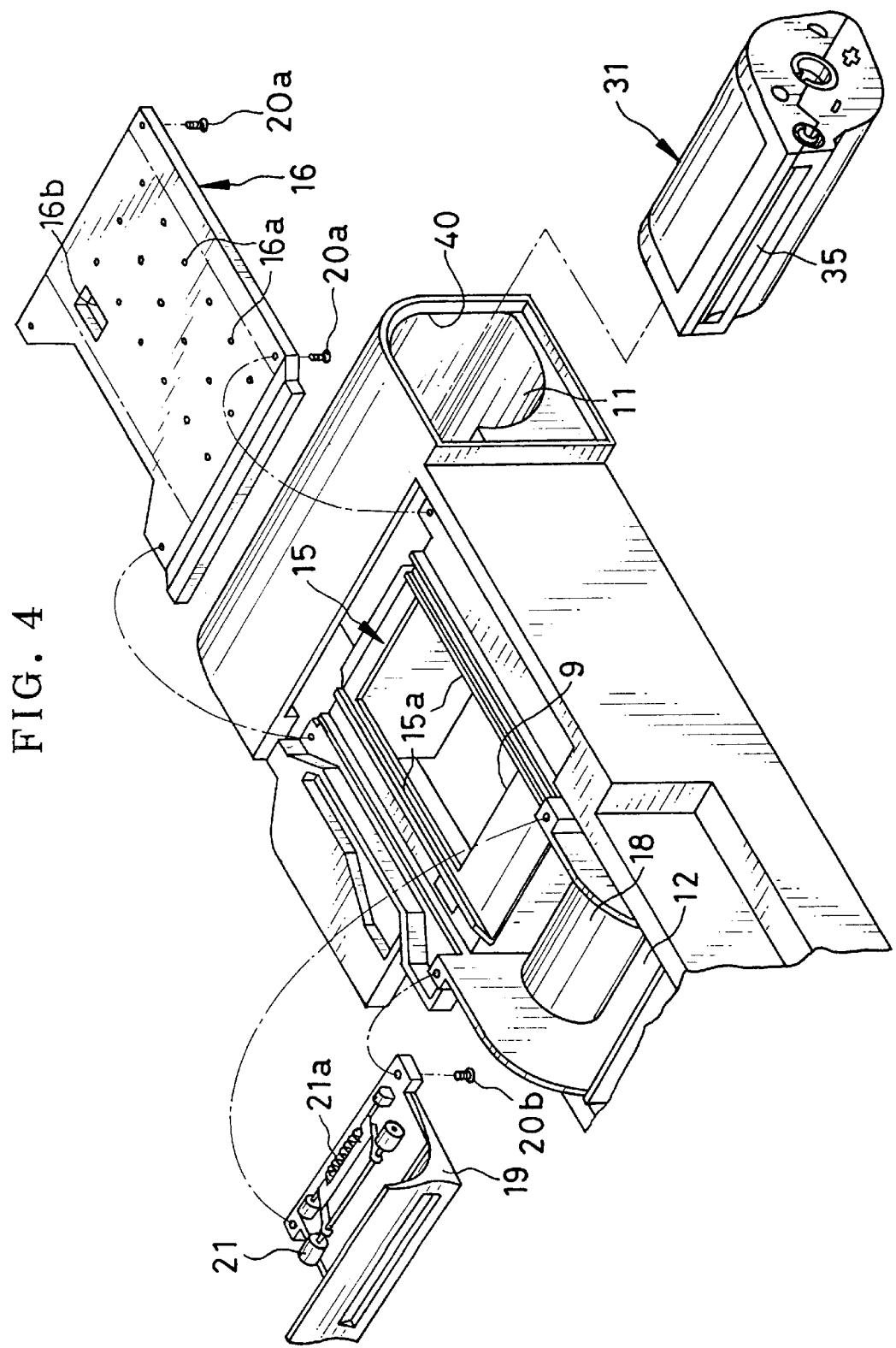
FIG. 4 is an explanatory view illustrating a rear side of a main body according to the present invention.
Figure 5:
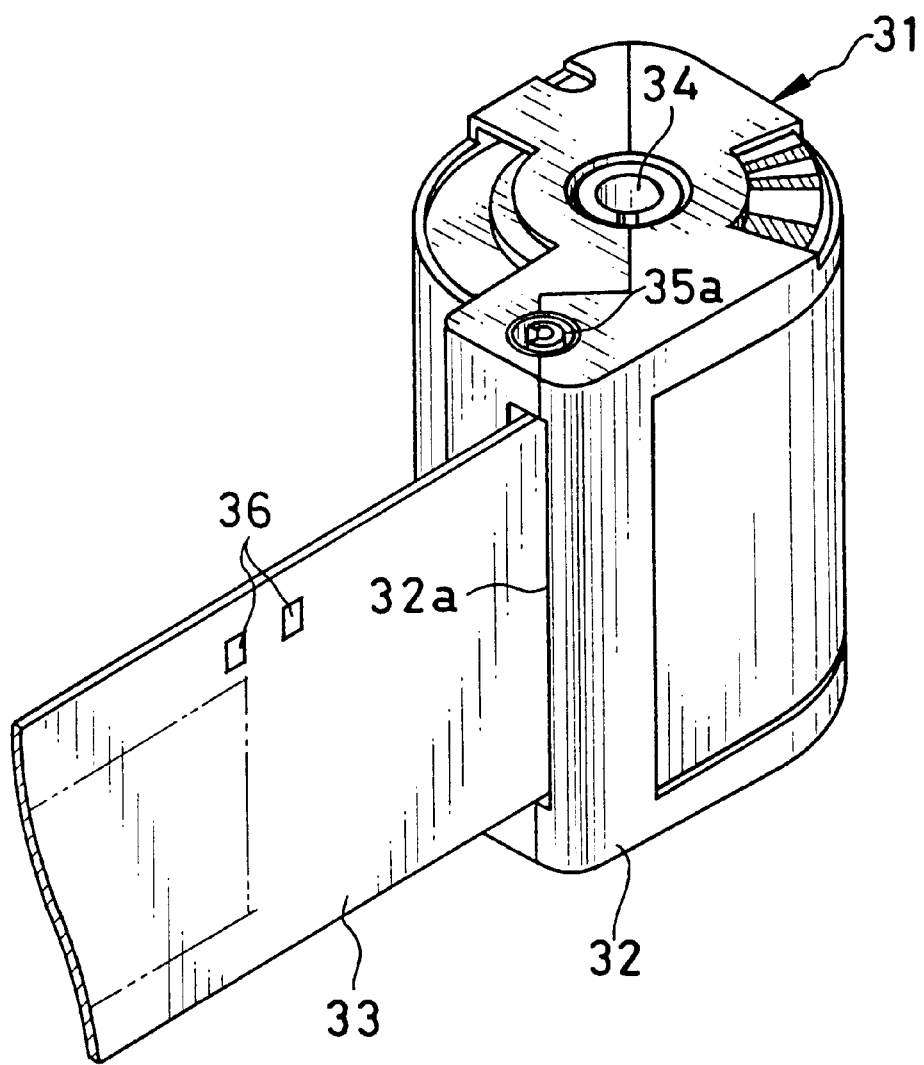
FIG. 5 is an explanatory view illustrating a photo film cartridge used in the camera.

FIG. 4 is an explanatory view illustrating a rear side of the main body. The cartridge chamber 11 contains a photo film cartridge 31. In other words, the cartridge chamber 11 is provided with a bottom opening 40 through which the photo film cartridge 31 is inserted into the cartridge chamber 11 in an axial direction of the cartridge spool. As shown in FIG. 5, the photo film cartridge 31 includes a cartridge shell 32 and a photo film 33 contained therein. A cartridge spool 34 is rotatably disposed in the cartridge shell 32. An end edge of the photo film 33 engages with the spool and the photo film 33 is wound thereonto.

A shield lid 35 is rotatably attached to a cartridge shutter shaft 35a which is disposed in the cartridge shell 35. The shield lid 35 closes a cartridge mouth 32a of the cartridge shell 32 in light-tight manner. The photo film 33 is provided with two perforations 36 per frame. The photo film 33 is advanced from the cartridge mouth 32a by rotating the cartridge spool 34.

A film passage is formed at the rear side of the exposure aperture 9 disposed between the cartridge chamber 11 and the film take-up chamber 12. The film passage includes a passage channel 15 which is integrally formed with the main body 3 and a film support plate 16 which covers the rear side of the film channel 15. The passage channel 15 is provided with rails 15a which are disposed at above and under of the exposure aperture 9, namely, at both sides of the exposure aperture relative to longitudinal direction thereof. The rails 15a support both side edges of the photo film 33 so that friction of the photo film 33 passing through the film passage is reduced. Accordingly, the photo film 33 is moved smoothly. Further, the rails 15a guide the photo film passing through the film passage.

The film support plate 16 is fixed to the main body 3 by screws 20a so as to cover the passage channel 15. On the inner surface of the film support plate 16, there are integrally formed small projections 16a therewith. The projections 16a support the rear face of the photo film 33 to reduce friction between the photo film 33 and the support plate 16. In a corner portion of the film support plate 16, there are formed an opening 16b into which a sensor 16c is inserted. The sensor 16c detects the perforations 36 of the photo film 33.

Upon covering the passage channel 16 with the film support plate 16, the inside of the slit-like film passage is maintained light-tightly before attaching the rear cover 5. Thus, the photo film 33 supported by the rails 15a and the projections 16a is smoothly advanced in the light-tight film passage disposed between the cartridge chamber 11 and the film take-up chamber 12.

A camera spool 18 having a built-in motor is provided in the central portion of the film take-up chamber 12. A film take-up chamber cover 19 is attached to the rear side of the film take-up chamber 12 by screws 20b. The film take-up chamber cover 19 constitutes a part of a wall of the film take-up chamber 12. A roller 21 is attached to the inside of the film take-up chamber 19. The roller 21 presses the photo film 33 advanced by way of the film passage toward the camera spool 18. For this operation, the roller 21 is urged by a coil spring 21a toward the camera spool 18.

The inside of the film take-up chamber 12 is maintained in light-tight state by covering the rear side of the film take-up chamber 12 with the film take-up chamber cover 19 before attaching the rear cover 5. The photo film 33 advanced by way of the film passage is pressed toward the camera spool 18 by the roller 21 and wound around the camera spool 18 as a film roll 33a by rotating the camera spool 18.

As described above, the film support plate 16 and the film take-up chamber cover 19 are attached to cover the passage channel 15 and the film take-up chamber 12 respectively so as to complete an independent light-tight space in which the photo film 33 is moved from the cartridge chamber 11 to the film take-up chamber via the film passage.

The first front cover 4a and the second front cover 4b covering the front face of the main body 3 are provided with openings for exposing the lens barrel 10, the finder 7, the flash device 8 and so forth. Further, a shutter release button 23 is integrally formed with the first front cover 4a on the top portion thereof. The rear cover 5 is provided with a window for exposing a liquid crystal display (not shown) and a battery cover 24 of a battery chamber. The rear cover 5 is secured to the rear face of the main body 3 to cover the rear face thereof. A bottom lid 37 is rotatably attached to the main body 3 in order to load the photo film cartridge 31 into the cartridge chamber 11 of the main body 3. When the bottom lid 37 is opened, the photo film cartridge 31 is inserted into the cartridge chamber 11. After that, the bottom lid 37 is closed, namely, the bottom opening 40 is closed by the bottom lid 37. An ornamental member 38 is attached to the second front cover 4b. The ornamental member 38 is provided with claws 39 which engage with the first front cover 4a so that the ornamental member 38 is fixedly secured to the first front cover 4a via the second front cover 4b.

An operation of the preferred embodiment is hereinafter described. When the camera 2 according to the present invention is manufactured, the film support plate 16 and the film take-up chamber cover 19 are attached to the rear side of the main body beforehand equipped with the shutter device (not shown), the lens barrel 10 having the taking lens 6, the finder 7, the flash device 8 and so forth.

The film support plate 16 is attached to cover the rear side of the passage channel 15 so that the film passage is completed. Next, the film take-up chamber cover 19 is attached to the rear side of the film take-up chamber 12. Thus, the independent light-tight space in which the photo film 33 is moved from the cartridge chamber 11 to the film take-up chamber 12 via the film passage is completed before the attaching the rear cover 5 to the main body 3.

An advancement test of the photo film 33 is carried out after loading the photo film cartridge 31 into the cartridge chamber 11 and before attaching the first front cover 4a, the second front cover 4b and the rear cover 5 to the main body 3. After the cartridge mouth 32a is opened by rotating the shield lid 35, the photo film 33 is advanced in accordance with the rotation of the cartridge spool 34. The advanced photo film 33 reaches the film take-up chamber 12 by way of the light-tight film passage. After that, the top end of the photo film 33 is guided toward the camera spool 18 by the roller 21 of the film take-up chamber cover 19.

Upon reaching of the top end of the photo film 33 to the camera spool 18, the cartridge spool 18 rotating from the time when the photo film was advanced is rotated in photo film winding direction. And then, the photo film 33 is wound around the camera spool 18, being pressed toward the camera spool 18 by the roller 21 so that the film roll 33a is formed.

If defective winding of the photo film is generated for some reason at this time, it is not required to remove the rear cover 5 as the rear cover 5 has not yet attached to the main body 3. Accordingly, it is possible to reexamine the camera easily. On the other hand, the main body 3 passing the advancement test of the photo film is attached with the front covers 4a and 4b and the rear cover 5, and then manufacturing of the camera 2 is completed.

As described above, the independent light-tight space is completed by providing the film support plate 16 covering the rear side of the passage channel 15 and the film take-up chamber cover 19 covering the rear side of the film take-up chamber 12 before the attaching the rear cover 5 to the main body 3. In the independent light-tight space, the photo film 33 is moved from the cartridge chamber 11 to the film take-up chamber 12 via the film passage. Therefore, the advancement test of the photo film may be carried out easily.

In the above-described embodiment, the film support plate and the film take-up chamber cover are secured by screws. However, the film support plate and the film take-up chamber cover may be provided with claws and attached to the main body by engaging the claws with the main body. Further, the rear cover is attached to the rear side of the main body including the film support plate and the film take-up chamber cover. However, the rear cover may cover the rear side of the main body except the film support plate and the film take-up chamber cover.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A camera having a main body formed with a cartridge chamber, a film take-up chamber and an exposure aperture, and a rear cover attached to rear of said main body, said cartridge chamber containing photo film cartridge from which a photo film is advanced by rotating a cartridge spool while said rear cover is not attached to the rear of said main body, said film take-up chamber being provided with a camera spool for winding said photo film advanced from said photo film cartridge and a roller for pressing said photo film toward said camera spool, said exposure aperture forming a picture frame on said photo film, said camera comprising:

a film take-up chamber cover attached to said main body so as to constitute a part of a wall of said film take-up chamber inside said rear cover, said film take-up chamber cover being provided with said roller fixed to an inside thereof; and a film support plate attached to said main body so as to cover said exposure aperture inside said rear cover, said film support plate forming a film passage from said cartridge chamber to said film take-up chamber between said film support plate and said main body, wherein said film take-up chamber cover and said film support plate form a light-tight passage for advancement of said photo film from said cartridge chamber to said film take-up chamber.

2. A camera according to claim 1, further comprising a spring for urging said roller toward said camera spool, said spring being fixed to said film take-up chamber cover.

3. A camera according to claim 1, wherein said film support plate is formed with small projections contacting a rear face of said photo film.

4. A camera according to claim 1, wherein said main body is provided with rails for guiding said photo film, said rails being disposed at both sides of said exposure aperture relative to longitudinal direction thereof.

5. A camera according to claim 1, wherein said cartridge chamber is provided with a bottom opening for inserting said photo film cartridge into said cartridge chamber in an axial direction of said cartridge spool, and a lid for closing said bottom opening.

6. A camera comprising:

a cartridge chamber for containing a photo film cartridge;

a film take-up chamber having a spool for winding a photo film advanced from said photo film cartridge;

an exposure aperture disposed between said cartridge chamber and said film take-up chamber for forming a picture frame on said photo film;

a film take-up chamber cover disposed at a rear of said film take-up chamber for constituting a part of rear wall of said film take-up chamber; and a film support plate disposed at rear of said exposure aperture, said film support plate forming a film passage from said cartridge chamber to said film take-up chamber wherein said film take-up chamber cover and said film support plate form a light-tight passage for said photo film as said photo film advances from said cartridge chamber to said film take-up chamber when a back cover of the camera is open.

7. A camera according to claim 6, further comprising a roller attached to an inside of said film take-up chamber cover for urging said photo film toward said spool.

* * * * *